No. 764,205. PATENTED JULY 5, 1904.
A. D. REYNOLDS.
HARVESTER.
APPLICATION FILED OCT. 27, 1903.
NO MODEL. 3 SHEETS—SHEET 3.

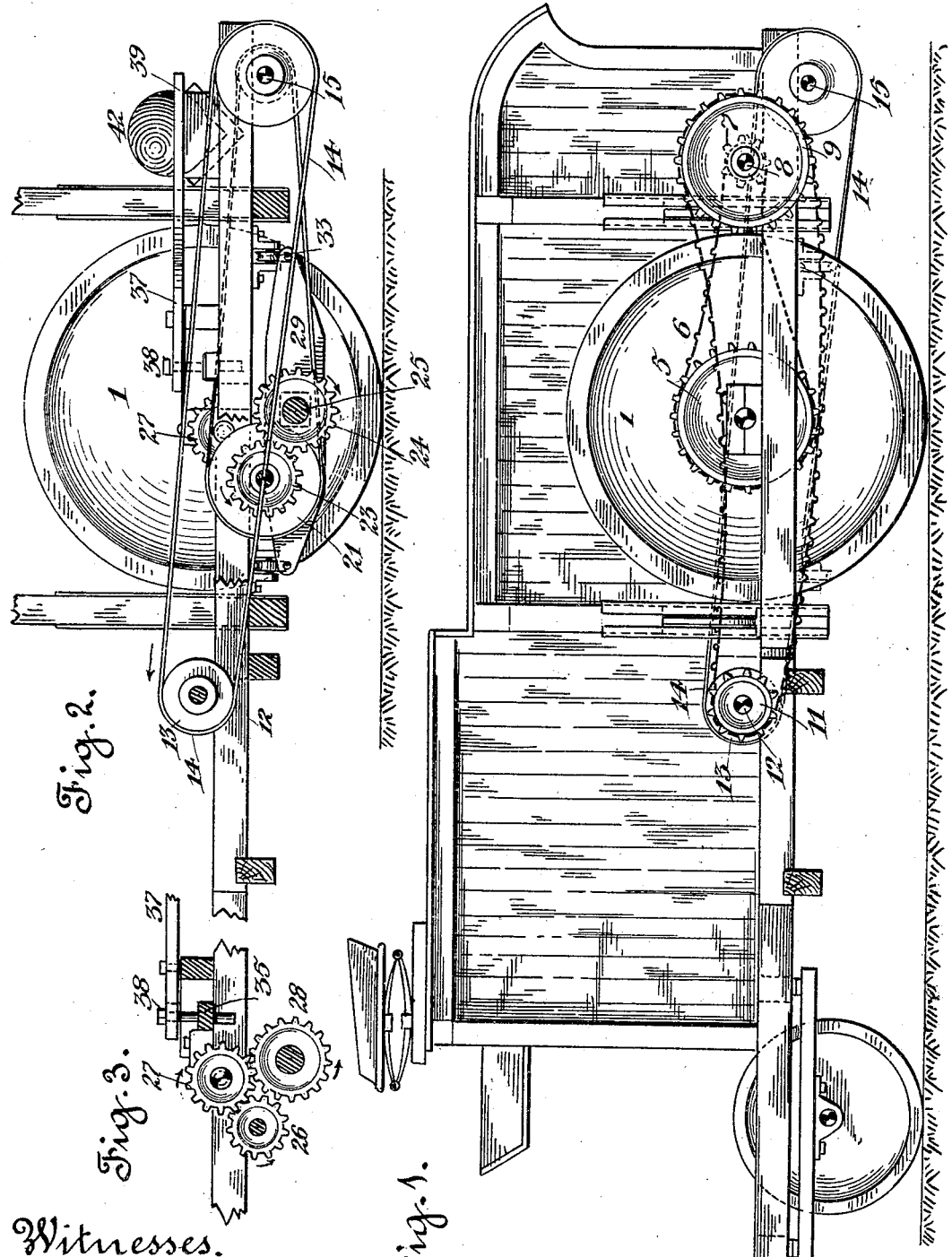

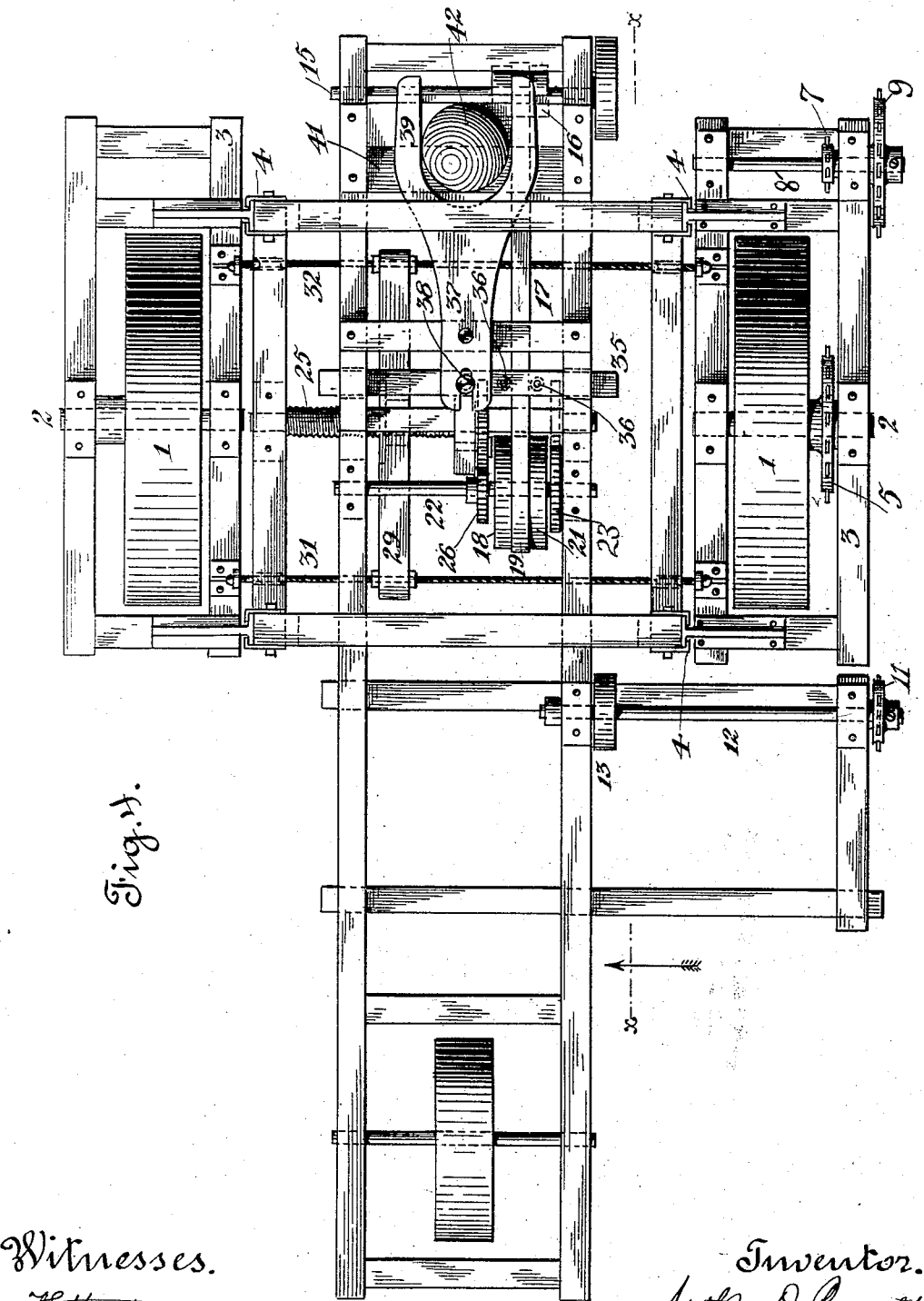

Witnesses.
Inventor.
Arthur D. Reynolds
by Spear & Seely Attys

No. 764,205. Patented July 5, 1904.

UNITED STATES PATENT OFFICE.

ARTHUR D. REYNOLDS, OF SAN FRANCISCO, CALIFORNIA, ASSIGNOR TO REYNOLDS MANUFACTURING COMPANY, A CORPORATION OF CALIFORNIA.

HARVESTER.

SPECIFICATION forming part of Letters Patent No. 764,205, dated July 5, 1904.

Application filed October 27, 1903. Serial No. 178,770. (No model.)

*To all whom it may concern:*

Be it known that I, ARTHUR D. REYNOLDS, a subject of the King of Great Britain, residing at San Francisco, in the county of San Francisco and State of California, have invented certain new and useful Improvements in Harvesters, of which the following is a specification.

My invention relates to traveling harvesters, and especially to means for keeping the machine in a substantially level position transversely while being operated on hillsides.

One part of my invention refers to the means for connecting the carrying-wheels with the main framework of the machine, as well as to special means for bringing the main framework into a practically level position transversely upon a hillside, where ordinarily it would be in a tilted position. This part of the construction can be controlled by an operator if desired; but a further and important part of the invention relates to automatic control of the leveling devices whereby the initial tilting of the whole machine as it commences to respond to the slope will cause the said machine to level itself with relation to the slope of the hillside whether the latter remains at a certain inclination or increases in pitch or diminishes.

The improvements which constitute my invention are hereinafter described, and a practical enbodiment of them is shown in the accompanying drawings, in connection with which this specification should be read.

Figure 5:
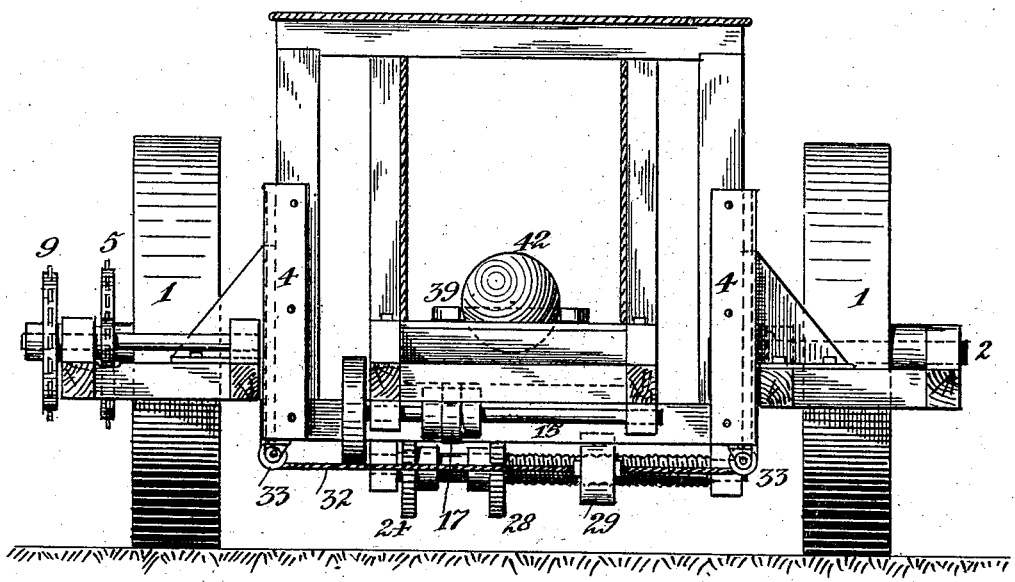
Figure 6:
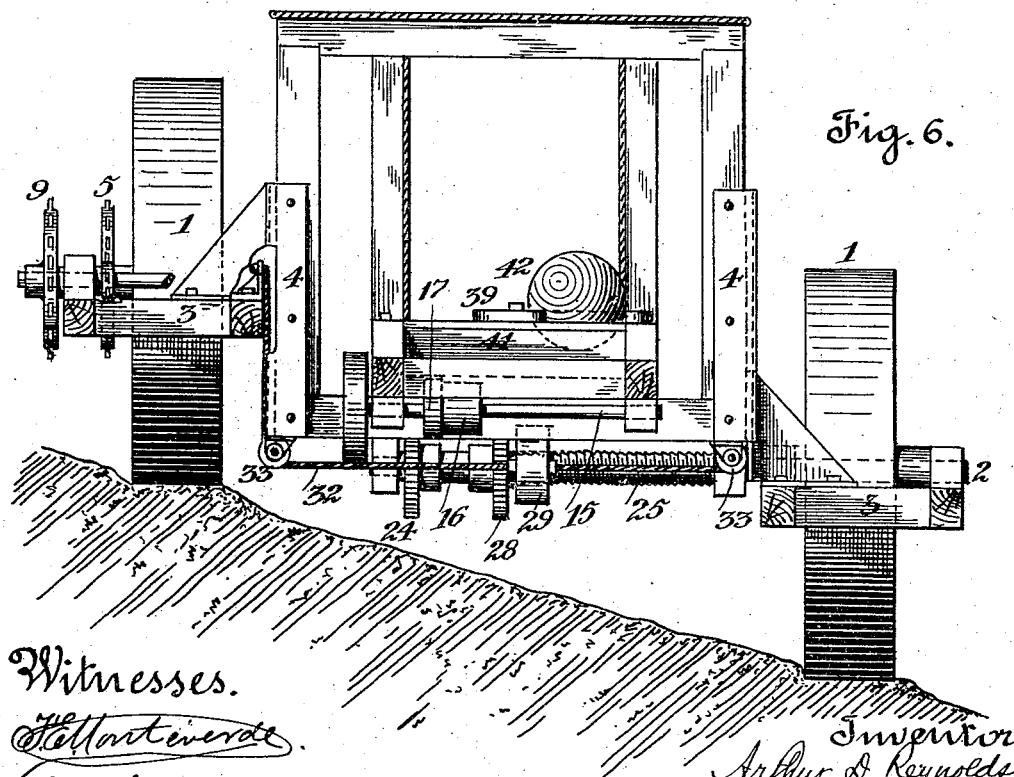

In the drawings, Figure 1 is a side elevation. Fig. 2 is a longitudinal section on line $x\,x$ of Fig. 4. Fig. 3 is a detail view of gears for reversing the screw-shaft which controls the leveling of the machine. Fig. 4 is a plan view of the machine. Fig. 5 is a rear elevation of the machine upon level ground. Fig. 6 is a similar view showing the machine in operation upon a hillside.

My invention has no reference to the action of the harvester as a grain cutter or conveyer, and hence the harvesting devices have been omitted from the drawings for the sake of clearness in delineation. The general appearance of the machine is, however, shown in Fig. 1.

The main carrying-wheels are represented at 1 1. The wheel on one side of the machine is entirely independent, so far as mounting and running are concerned, of the wheel on the other side, and each wheel is journaled by a short shaft 2 in a vertically-adjustable frame 3, which can slide in guides 4 on the main structure of the harvester. While I have shown and prefer to use a loose carrying-wheel on each side, substantially the same results are produced as to leveling the frame if only one wheel is loosely mounted relatively to the frame, while the opposite wheel has a fixed mounting relatively to the frame. I prefer to drive the connecting mechanism by which the adjustments are produced from one side of the machine and for that purpose have shown a main driving-sprocket 5 upon one wheel-axle. Thence a chain 6 conveys motion in the same direction as the wheel to a sprocket 7 upon the parallel shaft 8 at the rear. (See Figs. 1 and 4.) Thence by sprockets 9 11 is driven a forward parallel shaft 12, having a pulley 13. From this shaft a belt 14 transmits motion to a second rear shaft 15, located at about the middle of the machine and extending transversely. I do not limit myself to these precise driving connections, my object being to obtain a constantly-driven transverse shaft substantially in the middle of the machine, from which connections can extend for accomplishing the necessary adjustments. The shaft 15 has a wide pulley 16, from which a belt 17 extends forwardly to either of three loose pulleys 18 19 21 on a stationary shaft 22. In the position of Figs. 4 and 5 the belt 17 is in the intermediate position on the pulley 19, which is an idler. This is the position in the ordinary operation of the harvester upon level ground. If, however, the belt 17 be shifted to pulley 18 or to pulley 21, it becomes effective as a driving device, but in opposite directions, according to the pulley with which it engages. Referring to Fig. 6, the belt has been shifted to pulley 21. On the hub of that pulley and turning with it is a gear 23, which engages with another gear 24, fixed upon the transverse screw-shaft 25, journaled in the structure of the machine. When belt 17 is on pulley 21, the direct engagement of gears 23 24 will turn the screw in one direction. The pulley 18 carries a fixed gear 26, which is also connected to the screw 25; but the connection is by means of two gears 27 28 in order to reverse the motion of the screw.

Mounted upon the screw 25 and free to travel thereupon when the said screw is turned in either direction is a bar 29, having a hole constituting a threaded nut for engaging said screw. Secured to and passing through the ends of the bar are two transverse cables 31 32, which extend under rollers 33 on the main structure, and thence pass upwardly at right angles and are made fast to the movable frames. (See Figs. 4 and 6.) These wheel-frames are thus connected across the machine by said cables. If now the machine be in a somewhat tilted position, because it commences to travel upon a sidehill, it is evident that by moving the cables 32 a sufficient distance toward the hill the main framework of the machine must be brought to a level position, one side moving upwardly in the wheel-frame-guides heretofore described and the other side moving downwardly in the corresponding guides upon the opposite side. This transverse movement of the cables in either direction is caused to take place whenever the normal level position of the machine is disturbed.

The shifting of the belt from one pulley to another and the consequent turning of the screw can be controlled by an operator with any suitable kind of hand-operated belt-shifter according to his judgment; but I have devised automatic means for accomplishing the same result, which is put in operation by the tilting of the machine itself as it comes upon the hillside and keeps it in level or substantially horizontal position independently of an operator, while it is working upon such hillside. Such automatic device comprises, substantially, a belt-shifter operated by the tilting of the machine itself as the ground commences to change from the level to a slope. In Fig. 4 such a belt-shifter is shown and comprises a bar 35, movable across the machine in suitable guides and having pins or studs 36, between which the belt 17 passes, as shown. A lever 37 is pivoted to the machine structure and engages with the shifter-bar by a slot-and-pin connection 38. The other end of the lever has a fork 39, which overlies a ball-race 41 and receives the ball 42 in said race. This ball is of such size, weight, and ease of motion that as soon as the machine commences to tilt it commences to exert its gravity against the fork and lever, and as the tilting continues it gradually throws the belt-shifter in the required direction. The proper gearing then takes effect, the cable-bar is moved on the screw, the cables are moved transversely, and the machine commences and continues to adjust itself according to the slope, one side of the machine rising in its guides and the other falling, producing the position of Fig. 6, with the wheels conforming to the hillside, as shown.

When the machine has leveled itself according to the degree of slope upon which it is traveling, the ball will roll to the middle of the ball-race, and I prefer to slightly elevate the ends of said ball-race in order to facilitate this movement of the ball. This shifts the belt to the idler-pulley, and no further movement of the leveling device will take place until some change in the degree of slope causes the ball to roll to one side or the other.

While I have shown an arrangement of pulleys and a shifting-belt for operating the screw and for permitting it to remain idle, I regard it as an equivalent construction to use gears instead with any suitable clutch mechanism for driving and reversing the same shaft and permitting it to remain idle. Such arrangements of gearing will be within the knowledge of all skilled mechanics in the light of the foregoing description. Therefore I do not limit myself to the precise constructions and arrangements herein described, and shown in the drawings, as I desire to avail myself of such modifications and equivalents as come properly within the spirit of my invention.

Having described my invention, what I claim as new, and desire to secure by Letters Patent, is—

1. In a traveling harvester, a main frame for supporting the harvesting machinery, in combination with a loosely-mounted carrying-wheel and with means actuated by a transverse tilting motion of the machine for bringing the main frame to a substantially level position.

2. In a harvester, a main frame, loosely-mounted carrying-wheels, transverse cables connecting the wheels upon which cables the main frame is suspended, and means operated by the tilting of the machine for moving the cables whereby the main frame is maintained in a substantially level position.

3. In a harvester, opposite wheel-frames adjustable relatively to the machine, a cable connecting the said frames across the machine, and means operated by the tilting of the machine for moving said cable in either direction whereby the machine is brought to a substantially level position.

4. In a harvester, a main frame, in combination with a vertically-adjustable wheel-frame, a carrying-wheel journaled in said wheel-frame, and means actuated by a transverse tilting motion of the machine, for bringing the main frame to a substantially level position.

5. In a harvester, the combination with an adjustable wheel-frame of a cable connected to said frame, a transverse screw, a traveling bar thereon to which said cable is connected, gearing adapted to leave said screw idle, and to turn it in either direction, and means operated by the tilting of the machine for causing said gearing to operate said screw, substantially as and for the purposes set forth.

6. In a harvester, vertically-movable carrying-wheels, cables connecting them across the machine for the described purpose, a transverse screw-shaft, a shaft having two pulleys geared to said screw-shaft so as to revolve it respectively in opposite directions, an intermediate idle pulley on said shaft, a belt for driving said shaft and a belt-shifter, all substantially as and for the purposes set forth.

7. In a harvester, a main body or structure, a vertically-movable carrying-wheel, a connection from said wheel to said frame, and means operated by the tilting of the structure for operating said connection, so as to permit the structure to maintain a substantially level position upon a hillside.

8. In a harvester, a main body or structure, vertically-movable wheel-frames having connections across the machine and means actuated by the tilting of the structure for automatically operating said connections so as to permit the body of the machine to maintain a level position upon a hillside.

9. In a harvester, vertically-movable wheel-frames, connections between said frames, means for moving said connections when the machine leaves the level, and means carried by the machine, and actuated by its tilting, for placing said connections in operation.

10. In a harvester, wheel-frames vertically movable, cables connecting them across the machine, a transverse screw-shaft, a traveling bar on said screw-shaft secured to said cables, driving-gears and reversing-gears connected to said screw-shaft, an idle gear between said driving and reversing gears, a shifting device for engaging either of said gears, a lever for operating said shifting device, and a movable weight engaging said lever and operating by its own gravity upon the tilting of the machine to actuate said shifting device.

11. In a traveling harvester, and in combination, a main frame, side wheels relatively to one or both of which the said frame is adapted to move vertically up and down, connections between the main frame and one or both of said side wheels, and means comprising a ball or weight operating by its own gravity upon the tilting of the machine, for operating said connections.

In testimony whereof I have affixed my signature, in presence of two witnesses, this 14th day of October, 1903.

ARTHUR D. REYNOLDS.

Witnesses:
L. W. SEELY,
M. R. SEELY.